United States Patent [19]

Balsys et al.

[11] Patent Number: 4,522,223

[45] Date of Patent: Jun. 11, 1985

[54] DOUBLE POPPET VALVE

[75] Inventors: Manfred Balsys; Dieter Kling, both of Biberach; Hans Maier, Laupheim; Franz Miller, Biberach; Walter Schmid, Ummendorf, all of Fed. Rep. of Germany

[73] Assignee: Albert Handtmann Armaturenfabrik GmbH & Co., KG., Fed. Rep. of Germany

[21] Appl. No.: 505,390

[22] Filed: Jun. 17, 1983

[30] Foreign Application Priority Data

Jul. 2, 1982 [DE] Fed. Rep. of Germany ....... 3224852

[51] Int. Cl.$^3$ .......................... F16K 11/20; B08B 9/02
[52] U.S. Cl. .................................... 137/240; 137/312; 137/614.17; 137/614.18; 137/614.19; 137/637.2; 134/166 C; 251/332
[58] Field of Search ................... 137/240, 312, 614.17, 137/614.18, 614.19, 637.2, 375; 251/332; 134/166 C

[56] References Cited

U.S. PATENT DOCUMENTS

| | | | |
|---|---|---|---|
| 2,202,735 | 5/1940 | Johnson | 137/375 |
| 3,126,028 | 3/1964 | Kurfiss | 251/332 |
| 3,508,581 | 4/1970 | Woessner | 137/637.2 |
| 3,552,426 | 1/1971 | Hester | 137/375 |
| 4,304,251 | 12/1981 | Schädel et al. | 137/312 |
| 4,344,453 | 8/1982 | Tuchenhagen et al. | 137/240 |
| 4,360,039 | 11/1982 | Jeppsson | 137/614.19 |
| 4,368,753 | 1/1983 | Bräkelmann | 137/312 |
| 4,373,545 | 2/1983 | Knappe | 137/312 |

FOREIGN PATENT DOCUMENTS

| | | | |
|---|---|---|---|
| 2531019 | 1/1977 | Fed. Rep. of Germany | 137/312 |
| 2609791 | 9/1977 | Fed. Rep. of Germany | 137/240 |
| 2523202 | 11/1979 | Fed. Rep. of Germany | |

Primary Examiner—George L. Walton
Attorney, Agent, or Firm—James E. Nilles

[57] ABSTRACT

The present invention relates to a double poppet valve comprising two independently movable valve heads cooperating with a valve seat located in a valve housing between an inlet duct and an outlet duct for a liquid product, and enclosing therebetween in the open position as well as in the closed position a leak control space adapted to be sealed in the open position of the valve to reduction of the distance between the two valve heads caused on opening of the valve by one of the valve heads being advanced so as to engage the other valve head at the end of a predetermined stroke, whereafter the two valve heads are forced into mutual sealing engagement by a spring force, the advancing valve head being affixed to a hollow actuating rod adapted to have supplied therethrough a cleaning liquid for said leak control space, a drain pipe communicating with said leak control space being provided for draining said cleaning liquid to the exterior. The invention provides that the follower valve head is connected to an actuating tube in which the actuating rod of the advancing valve head is slidably guided, that furthermore the seat for the two valve heads is formed as a cylindrical valve seat, and that the hollow actuating rod of the advancing valve head is provided in the vicinity of the leak control space with injection bores for said cleaning liquid opening into said space in radial directions.

9 Claims, 9 Drawing Figures

DOUBLE POPPET VALVE

The present invention relates to a double poppet valve comprising two independently moveable valve heads cooperating with a valve seat located in a valve housing between an inlet duct and an outlet duct for a product, and enclosing therebetween in the open position as well as in the closed position a leak control space adapted to be sealed in the open position of the valve due to a reduction of the distance between the two valve heads caused on opening of the valve by one of the valve heads being advanced so as to engage the other valve head at the end of a predetermined stroke, whereafter the two valve heads are forced into mutual sealing engagement by a spring force, the advancing valve head being affixed to a hollow actuating rod adapted to have supplied therethrough a cleaning liquid for said leak control space, a drain pipe communicating with said leak control space being provided for draining said cleaning liquid to the exterior.

From German Offenlegungsschrift No. 25 31 019 there is known a double poppet valve of the type indicated above, wherein the valve seat is of conical configuration. The stem of the upper valve head extends upwards, while that of the lower valve head extends downwards. Each stem is surrounded by a separate helical compression spring providing a bias for effecting the closing movement. Both valve heads are moveable independently of one another in such a manner that the upper valve head is still carrying out its closing movement, while the lower valve head has already attained its closed position. The result is that in the closed position of the two valve heads, in which they are both in engagement with the conical valve seat, the two valve heads are supported in spaced relationship to one another, enclosing a cavity there-between that serves as the leak control space. As generally known, this leak control space serves to indicate faulty closure of the valve in the closed position thereof by draining liquid product penetrating thereinto due to faulty sealing of the valve seat to the exterior through a drain pipe connected thereto.

For cleaning the valve in its assembled state, a cleaning liquid is injected into the leak control space through the hollow stem of the upper valve head vertically to the plane of the control space. This cleaning liquid is subsequently drained to the exterior through the hollow stem of the lower valve head which forms the already mentioned drain pipe. As the two valve stems are coaxially aligned with respect to one another, so that a considerable portion of the injected cleaning liquid would directly escape through the lower valve stem without performing any cleaning action, a plate-shaped baffle member is located in the central portion of the leak control space.

This known double poppet valve suffers from various disadvantages. Due to the above described location of the baffle member, the greatest cleaning effect will be obtained between the two coaxially aligned valve stems on the baffle member itself and on the portion of the upper valve head facing the baffle member. The usually more contaminated portions, namely, the radially outer portions of the valve heads and the portion of the valve seat extending between the seat surfaces thereof will be insufficiently cleaned.

A further disadvantage is that the seat surfaces of the valve seat, i.e. the most contaminated regions of the valve, cannot be cleaned at all. This is because cleaning of the valve can only be carried out in the closed state thereof, in which the seat surfaces are necessarily covered by the valve heads and thus not exposed to the cleaning liquid. During the downwards opening movement of the valve, the seat surfaces of the valve seat are uncovered, as a matter of fact, so as to be accessible for the cleaning liquid. In this state it is unavoidable, however, that due to the conical configuration of the valve seat, cleaning liquid as well as contaminations carried therein enter the product conduits (inlet and outlet ducts) so as to contaminate the liquid product. This is unacceptable, however, in view of the stringent requirements in the field in which such valves are mainly used, namely, in the food processing industry.

Due to the impossibility of cleaning the seat surfaces, contaminations are apt to accumulate thereon, further deteriorating the seal between the valve heads and the housing, resulting in continuously increasing leakage of the liquid product through the leak control space to the exterior. These leakage losses can attain considerable proportions.

A further disadvantage of the conical configuration of the valve seat consists in that a certain amount of the liquid product leaks to the exterior through the leak control space during each opening and closing operation of the valve. This loss of liquid product is referred to as switching leakage.

Known from German Pat. No. 2,523,202 is a double poppet valve in which particularly the upper valve head operates in a manner similar to the operation of a spool valve, i.e. in which the valve seat is at least partially of cylindric configuration, so that the valve operates with reduced switching leakage. This valve is not, however, of the type to which the present invention is directed, as there are no provisions made for cleaning the valve in the assembled state. Moreover, even if a cleaning liquid were introduced, cleaning of the seat surfaces of both valve heads would not be possible, since in the closed state of the valve, these surfaces are covered by the valve heads and are only uncovered by the downwards proceeding opening movement of the valve. During this opening movement, however, the leak control space is closed off by the advancing movement of the upper valve head into engagement with the lower valve head, so that the cleaning liquid introduced into the leak control space would not be able to reach the seat surfaces.

It is an object of the present invention to improve a double poppet valve of the type set forth in the introduction in such a manner that a reliable sealing effect is ensured without any losses of liquid product due to leakage over an extended period of use.

In order to attain this object, the invention provides that the follower valve head is connected to an actuating tube forming a guide therethrough for the actuating rod of the advancing valve head, that furthermore the seat for the two valve heads is formed as a cylindric valve seat, and that the hollow actuating rod of the advancing valve head is provided in the vicinity of the leak control space with injection bores for said cleaning liquid opening into said space in radial directions.

The combination of a hollow actuating rod for actuating the advancing valve head and for introducing the cleaning liquid into the leak control space with the slidably guided arrangement thereof within an actuating tube employed for actuating the follower valve head enables the actuating rod and the actuating tube to be supported and guided within one another over a length corresponding at least to the outer diameter of the product conduit.

This longitudinally extended guide arrangement is unknown in prior art, and ensures improved guidance of the valve heads within the valve seat itself as well as during the critical phase of the penetration of the valve heads into the cylindric valve seat during the closing movement. As a result, a reliable sealing of the valve is ensured over an extended period of use with a correspondingly high actuation frequency.

The specific construction in which the actuating rod is guided through the actuating tube further permits both valve heads to be independently operated from one side of the valve by means of only a single actuator. This results not only in a simplification of the conventional structural elements but also in greater ease of maintenance and repair works.

The provision of a cylindric valve seat for both valve heads permits the seat surfaces thereof to be readily cleaned from within the leak control space without the danger of the cleaning liquid entering the product conduits. To this purpose the two valve heads may be moved apart to such a degree that their seat surfaces corresponding to their closed positions are uncovered without the valve heads leaving the valve seat completely. This movement of the valve heads is greatly facilitated by the above noted arrangement of the actuating rod within the actuating tube. In this manner, the cylindric valve seat may be readily cleaned as frequently as desired, permitting even the smallest accumulations of contaminants to be removed, whereby the requisite sealing properties are maintained over an extended period of use. The cylindric valve seat is further indispensable for ensuring against switching leakage.

The provision of the actuating rod with radially opening injection bores for the cleaning liquid in the region of the leak control space is particularly suitable for cleaning the peripheral portions of the valve heads and the valve seat by means of liquid jets directed onto these areas. This means that the most contaminated portions of the valve are subjected to the most intensive cleaning action. Depending on the relative dimensions of the various components, it may be advantageous to form the injection bores in a nozzle-type configuration, so that the main portion of the injected cleaning liquid impinges on the valve seat at a high jet velocity. The lower speed of the peripheral portions of the injected jet is sufficient for cleaning the less contaminated radially inner portions of the valve heads.

It has been found that the combination of the above discussed characteristics is effective to maintain the sealing properties between the valve heads and the valve seat over a surprisingly long period of use.

For the simple and accurate control of the movements of the valve heads with the purpose of cleaning their seat surfaces it is advantageous that each valve head is moveable within the cylindric valve seat into engagement with a stop.

For ensuring perfect sealing properties over an extended period, the valve housing is preferably formed as an integral structure without any joints in the cylindric valve seat. In practical use it has been found that residues tend to accumulate preferentially adjacent the seals, particularly in the grooves holding them. These residues may be the cause for microbiological disorders, for instance in the brewing industry, in which yeast supplied to the brewing tank may accumulate adjacent the seals and be subsequently carried along by the furnished beer in the bottling operation, resulting in continued fermentation within the filled bottles.

A reduction of the required number of seals thus results in improved biological safety.

In accordance with an advantageous embodiment of the invention, the seal of each valve head consists of a seal ring projecting beyond the outer periphery of the valve head, and a pair of retaining rings closely adjacent both sides of the sealing ring, said retaining rings engaging the upper and lower sides, respectively, of the valve head and extending to points adjacent the connections between the valve heads and the actuating rod and actuating tube, respectively, so as to seal these connections. The sealing rings are in this case retained mainly by the retaining rings which are not subjected to any mechanical stress, whereby the life span of the sealing rings is extended. The described sealing rings are not subjected to destructive shearing forces as in the case of known constructions, in which the seal rings are retained on the sealing surface of the valve head as by means of a peripheral groove. In the described arrangement the sealing ring is preferably formed integrally with the retaining rings or separate therefrom of rubber or a rubber-like material, and vulcanized onto the valve head. These provisions are again effective to enhance biological safety.

According to a further improvement of the sealing ring construction of the invention, the sealing ring may be formed as an annular bead projecting above the surface of the valve head facing the opposite valve head. This results in the formation of a lip resiliently engaging the valve seat. Even if a sealing ring of this type is worn to a considerable degree, a suitable portion of the thus formed lip may be pressed into the gap between the valve head and valve seat by reducing the distance between the two valve heads, so as to further improve the sealing properties. Reduction of the distance between the valve heads also results in improved sealing of the leak control space with respect to the product conduits, particularly if the two lips are compressed in mutual engagement. Known valve sealing arrangements comprise a sealing ring located between the two valve heads in spaced relation to the radially outer edge of the valve heads. Additionally provided is a sealing ring between each valve head and the valve seat, such sealing rings being always disposed in spaced relation to one another in the axial direction of the valve, even in the open state of the valve, in which the two valve heads are in sealing contact with each other for sealing the leak control space. These two sealing rings, the first-mentioned sealing ring, the valve heads and the valve seat together define a cavity which is filled with the liquid product on each opening operation of the valve. On subsequent closing actuation of the valve, i.e. with the leak control space open, the liquid product contained in the cavity is drained to the exterior. Thanks to the described design of the sealing rings in the form of an annular bead comprising a lip, the volume of this cavity is reduced to zero in the open state of the valve, so that no liquid product is captured and subsequently drained to the exterior on closing the valve. In other words, there is no switching leakage, thanks to the provision that on opening of the valve, the two valve heads are brought into hermetically sealing mutual engagement while still within the cylindric valve seat, and are only then moved to leave the seat. The employ of a sealing arrangement of the described design is conducive to further improving biological safety.

For further improving the guidance of the valve heads, the drain pipe for the cleaning liquid is preferably connected to the advancing valve head so as to communicate with the leak control space through connecting bores. The drain pipe thus constitutes a coaxial extension of the actuating rod on the side of the valve heads opposite to the above described guide arrangement formed of the actuating rod and actuating tube. The drain pipe is guided in a passage through the outer product conduit wall disposed opposite the advancing valve head. This results in optimum guidance of both valve heads on both sides thereof, namely, by the guide arrangement of the actuating rod and actuating tube on the one side, and by the guidance of the drain pipe in the conduit wall on the other.

According to a further aspect of the invention, the actuating rod and the actuating tube are guided through an opening of the product inlet duct adapted to be closed by means of a cover, and hermetically isolated from the product by a bellows sealingly attached to the cover and to the follower valve head, while the drain pipe is guided through an opening of the product outlet duct adapted to be closed by a cover, and hermetically isolated from the product by a bellows sealingly attached to the cover and to the advancing or leading valve head. This hermetic sealing of the product conduits against the surrounding atmosphere is effective to preclude the danger of bacterial contamination of the product from the exterior through the guide openings formed in the conduit walls. The described arrangement may of course be reversed, with the inlet duct serving as the outlet duct and vice versa.

In order to improve the durability and reliability of this hermetic sealing arrangement, the bellows are preferably formed as metal bellows having respective ends welded to the associated cover and valve head.

The described hermetic sealing arrangement employing bellows permits the number of seals to be further reduced, resulting in further improved biological safety. In addition, the employ of complicated sealing structures at the passage of the actuating tube and the drain pipe, respectively, through the associated conduit walls is avoided. In this context it may be advantageous to employ a static seal for sealing the connection between the cover used for closing the respective opening and the product conduit or housing, respectively. In a specific embodiment of the invention, the cover for the opening of the product outlet duct is forced into engagement with the static seal from the interior by means of an exteriorly located clamping flange. An arrangement of this type greatly facilitates maintenance and repair works.

In a further advantageous embodiment with regard to maintenance and repair works, the invention provides that the cover for the opening of the product inlet conduit cooperates with an annular flange welded thereto and is forced into engagement with the static seal from the exterior by means of an exteriorly located carrier flange which also serves as the carrier for the entire double poppet valve.

A particularly advantageous construction of the stops against which the valve heads are axially displaceable for controlling their movement for uncovering the seat surfaces is characterized in that the stop for the follower valve head guided within the valve seat is affixed for instance to the valve housing at a distance from a flange corresponding to the movement of the valve head, said flange being located below the upper end of the actuating tube formed as a seat flange, and being forced into engagement with a stationary stop located opposite the stop member by a spring force acting on the seat flange.

In a further preferred embodiment the invention provides that the seal between the valve heads and the valve seat is formed by a sealing ring located within the valve seat, the width of said sealing ring corresponding to at least the maximum adjustable distance between the two valve heads within the valve seat.

In this context it is advantageous to provide a sealing ring in the periphery of the side of the advancing and/or of the follower valve head facing towards the leak control space, for forming a seal between the two valve heads in their open position.

Two preferred exemplary embodiments of the invention shall now be described with reference to the accompanying drawings, wherein.

Figure 1:
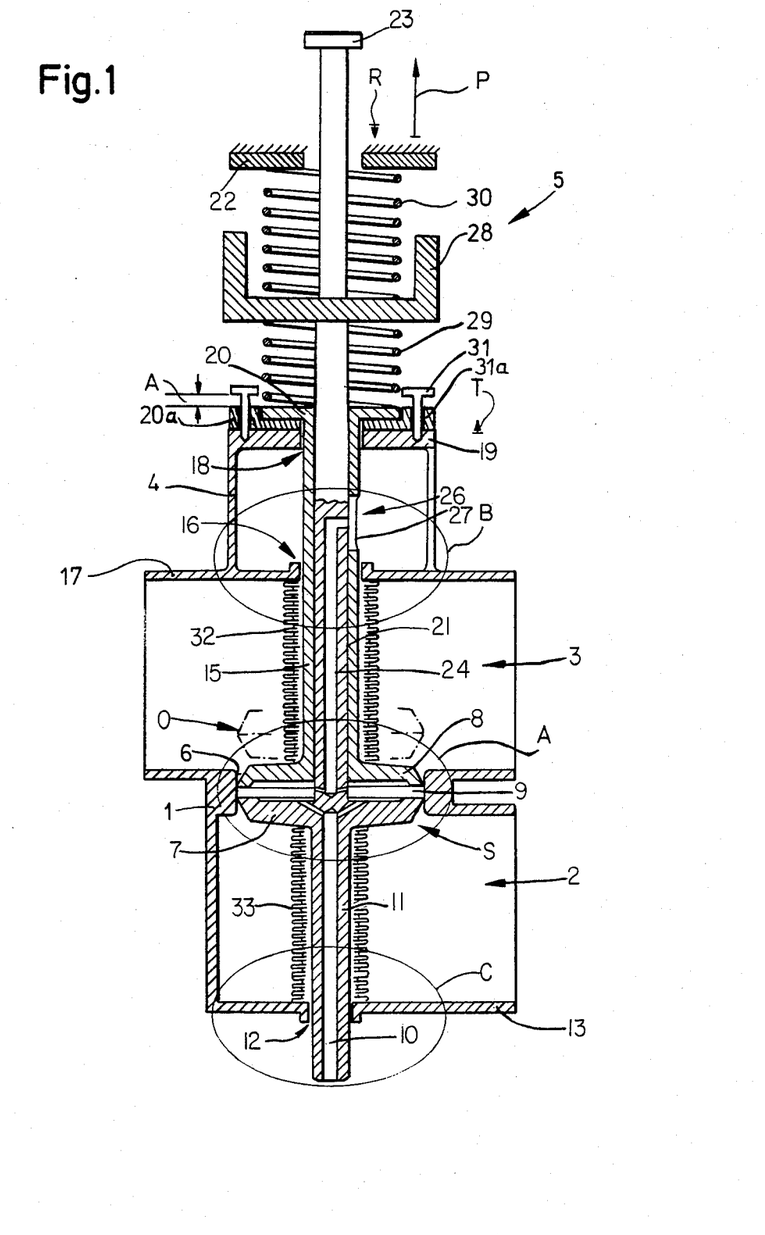
FIG. 1 shows a diagrammatic axial sectional view of a double poppet valve according to one embodiment of the invention.

A double poppet valve shown in FIG. 1 comprises a valve housing 1 provided with a lower product conduit 2 generally employed as an outlet duct, and an upper product conduit 3 generally employed as an inlet duct, an intermediate housing 4 disposed above housing 1, and actuator means 5 disposed above intermediate housing 4.

The peripheral wall surface of a cylindric bore connecting the two product conduits 2 and 3 constitutes a peripherally continuous valve seat 6 for an advancing valve head 7 and a follower valve head 8. Valve seat 6 has upper and lower bevelled edges. The outer peripheral surface of each valve head is of frusto-conical configuration formed in such a manner that the surfaces of the valve heads facing one another are of a larger diameter than their surfaces facing away from one another. The mutually facing surfaces of valve heads 7, 8 are each formed with a symmetric recess the diameter of which is selected such that the non-recessed surface portions form a relatively narrow ring. The cavity formed by the two recesses is designated as leak control space 9.

Advancing valve head 7 is connected to a central drain pipe 11 provided with a drain passage 10 and extending to the exterior of the valve through a lower opening 12 in a lower conduit wall 13 of lower product conduit 2. Drain passage 10 communicates with leak control space 9 through connecting bores 14 extending obliquely upwards or in a horizontal plane.

In a similar manner, follower valve head 8 is connected to an actuating tube 15 disposed coaxial with drain pipe 11 and extending through an upper opening 16 in an upper conduit wall 17 of upper product conduit 3, and further through an opening 18 in an upper wall 19 of intermediate housing 4. The upper end of actuating tube 15 is formed as a seal flange 20 received in a central recess of a flange 20a situated therebelow. Wall 19 forms a stationary stop for flange 20a and thus also for seal flange 20.

Extending through actuating tube 15 is an actuating rod 21, the lower end of which is connected to advancing valve head 7, while its upper end extends through a stationary upper closure member 22 of the double poppet valve and carries a flange-shaped head portion 23 at its end. A lower portion of actuating rod 21 is formed with an axial passage 24 for the introduction of a cleaning liquid into leak control space 9. Communication between leak control space 9 and axial passage 24 is established by radially extending injection bores 25 opening into leak control space 9. The cleaning liquid is supplied to the upper end of passage 24 through a connector nipple 26 located within intermediate housing 4 and extending through an elongate opening 27 in actuating tube 15. Between the upper closure member 22 of the double poppet valve and the stationary stop 19, actuating rod 21 carries an actuating plate 28 of U-shaped cross-sectional configuration kept in position by a lower return spring 29 cooperating with seat flange 20 and an upper return spring 30 cooperating with upper closure member 22.

A stop member 31a extends through a suitable opening adjacent the periphery of flange 20a and is fixedly attached to wall 19 of intermediate housing 4. A stop-forming head portion 31 of stop member 31a is located at a predetermined spacing A above flange 20a. There may of course be provided a plurality of stop members 31a in the form for instance of bolts formed each with a stop-forming head portion 31. Stop-forming head portion 31 serves for limiting the stroke of valve head 8 within valve seat 6 preparatory to cleaning the seat surface.

An upper metal bellows 32 surrounding actuating tube 15 is sealingly welded to the upper side of the follower valve head 8 and to upper conduit wall 17. In a similar manner, a lower metal bellows 33 surrounding drain pipe 11 is sealingly welded to the lower side of advancing valve head 7 and to lower conduit wall 13.

The metal bellows may of course be replaced by bellows formed of equivalent materials, for instance Teflon.

The above described double poppet valve according to the invention operates as follows:

In the closed state of the valve, both valve heads 7 and 8 are located within valve seat 6, with a predetermined spacing between the non-recessed annular ring surfaces of the valve heads facing one another. In this closed state S, follower valve head 8 is retained in a predetermined position by the engagement of seal flange 20 of actuating tube 15 through flange 20a with stationary stop 19 under the biasing force of lower return spring 29. The position of advancing valve head 7 may be determined essentially by properly selecting the forces exerted by the two return springs 29 and 30., it being of course possible to employ additional stop means to this purpose.

Due to the above described spaced arrangement of the two valve heads 7 and 8, leak control space 9 is in its open state. It is merely sealed with respect to product conduits 2 and 3 by a sealing arrangement between valve heads 7, 8 and valve seat 6, to be described later. In case of this sealing arrangement becoming worn or damaged, liquid product from product conduits 2 and 3 may enter leak control space 9, from where it drains to the exterior through drain pipe 11, indicating in a simple manner the faulty sealing of the valve seat.

To switch the valve to its open state O, actuating plate 28 is moved upwards by not shown means against the bias of upper return spring 30, whereby actuating rod 21 pulls advancing valve head 7 into engagement with follower valve head 8 still remaining in its closed position S, resulting in leak control space 9 being closed. Further upwards displacement of U-section actuating plate 28 into engagement of its legs with upper closure member 22 results in both valve heads 7 and 8 being moved upwards together to their open position O. This permits liquid product to flow from lower product conduit 2 into upper product conduit 3, or vice versa. Since the leak control space is now closed, as described above, the product liquid is prevented from entering it, so that there are no leakage losses.

The closing operation of the valve is carried out in reverse sequence by downwards displacement of actuating plate 28 and seat flange 20 under the bias of return springs 29 and 30, respectively, until the closed position S is attained. The opening or closing stroke is indicated by an arrow P in FIG. 1. During their opening and closing strokes, and particularly in the latter case during the critical phase of their entering the valve seat, the two valve heads are guided in the most effective manner at both sides thereof, namely, by the sliding support of the actuating rod within the actuating tube on the upper side and by the sliding support of the drain pipe in the lower wall of the lower product conduit on the lower side. This results in an improvement of reliable properties even over an extended period of use.

For cleaning the valve heads 7, 8 and valve seat 6, or, to be exact, the facing sides of the valve heads and their seat surfaces, a cleaning liquid is injected into leak control space 9 through connector nipple 26, passage 24 of actuating rod 21, and injection bores 25. Due to the radial orientation of injection bores 25, the injected liquid jets impinge on the most contaminated portions, namely, on the portion of the valve seat located between the valve heads, and on the peripheral portions of the valve heads themselves. The cleaning liquid and the contaminating material released thereby are subsequently drained to the exterior through connecting bores 14 and drain pipe 11.

For cleaning the seat surfaces covered by the valve heads in their closed position, the valve heads are adapted to be moved apart by a predetermined distance. To this effect, actuating rod 21 and thus advancing valve head 7 are moved downwards by not shown means to be disengaged from both of the shown stop means. This results in the seat surface previously occupied by valve head 7 being now accessible for the cleaning liquid. For uncovering the seat surface associated with the follower valve head 8, flange 20a is displaced upwards by not shown means into engagement with stop-forming head portion 31. The cleaning operation can only be carried out in the described manner, so that there is no danger of the cleaning liquid entering the product conduits, as the displacement of the valve heads is confined to the interior of the valve seat and corresponds to the distance A between flange 20a and stop 31.

Figure 5:
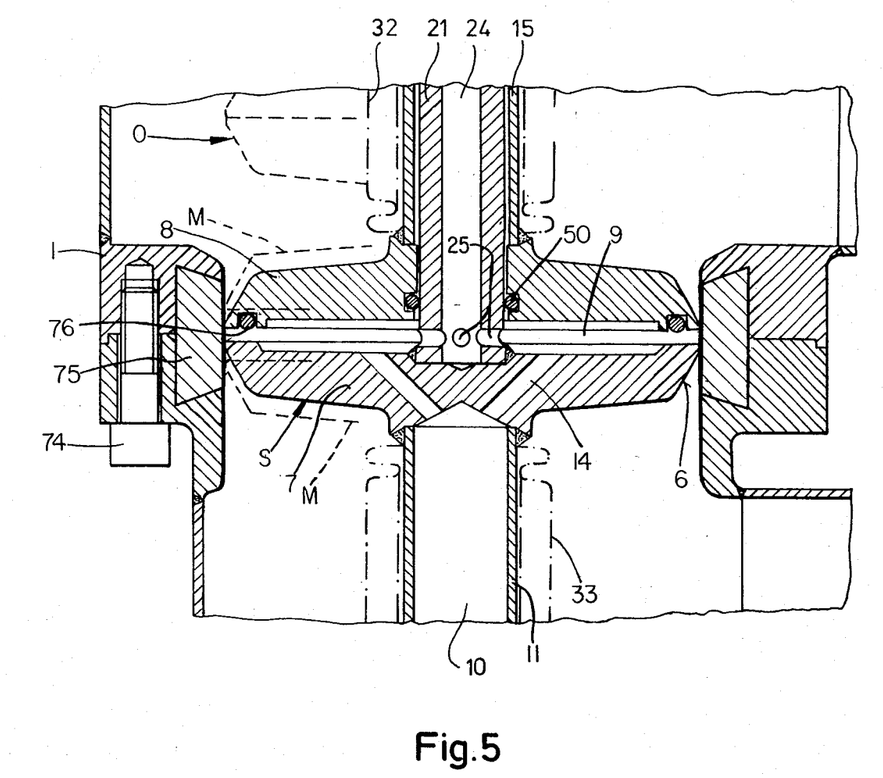
FIG. 5 shows an enlarged detail view corresponding to that shown in FIG. 2, but in a second embodiment of the invention.

The stroke corresponding to this opposite displacement of the two valve heads is indicated by arrows R and T in FIG. 1. In FIG. 5 the positions of the two valve heads during the seat surface cleaning phase are indicated by dotted lines as at M.

Cleaning of the leak control space may also be carried out with the valve in the open state without the danger of contamination of the liquid product. Due to the sealing engagement of valve heads 7 and 8 with one another, leak control space 9 is sealed against the exterior. As the leak control space is of a considerably reduced volume, the cleaning thereof is particularly effective.

Figure 2:
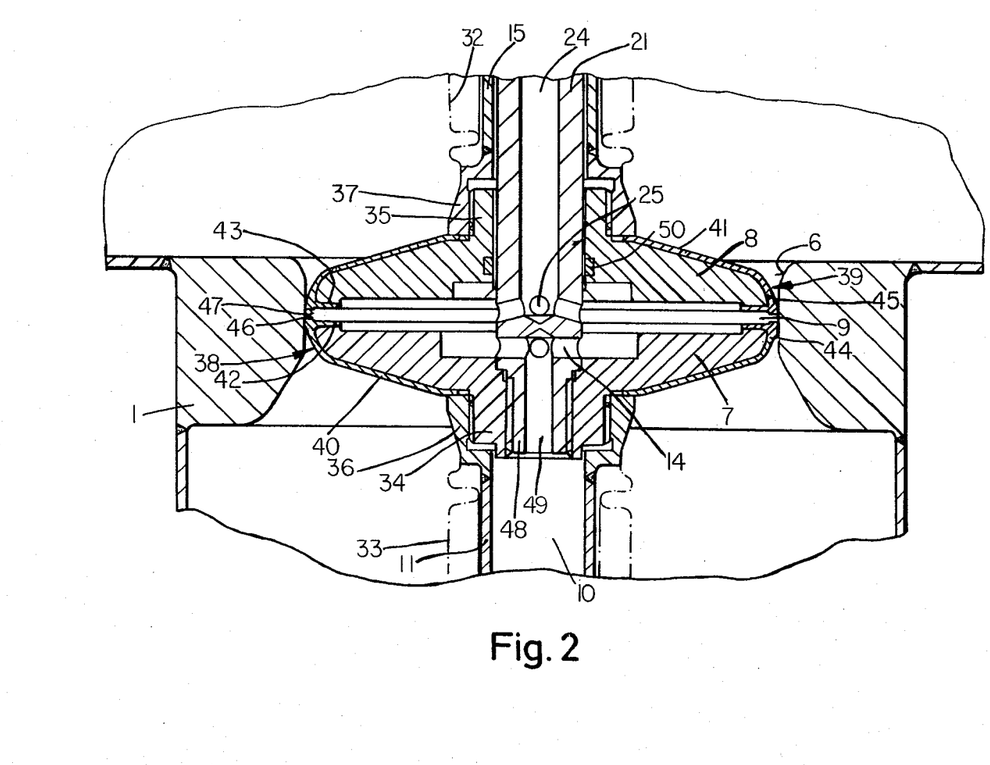
FIG. 2 shows an enlarged sectional view of a detail designated A in FIG. 1, showing the arrangement of a valve seat and valve heads in the closed state of the valve according to the first exemplary embodiment.

Shown in FIG. 2 on an enlarged scale are the two valve heads 7 and 8 in their closed position S. In contrast to the embodiment of FIG. 1, the recesses defining leak control space 9 are of a stepped configuration, with the radially innermost portions forming the deepest recess.

Each valve head 7, 8 is formed with a stepped projection 34 and 35, respectively, the cylindrical outer peripheral surface of which is provided with a screw thread for threaded engagement with an interiorly threaded sleeve 36 and 37, respectively. The lower sleeve 36 is sealingly welded to the upper end of lower bellows 33 and that of drain pipe 11, while the upper sleeve 37 is sealingly welded to the lower ends of upper bellows 32 and actuating tube 15.

Each valve head 7, 8 is provided with a seal 38 and 39, respectively, formed as an envelope partially surrounding the respective valve head. Each seal 38, 39 consists of an outer retaining ring 40 and 41, respectively, tightly engaging the axially outer surface of the respective valve head 7 or 8, respectively, an inner retaining ring 42 and 43, respectively, tightly engaging the axially inner surface of the valve head, and a sealing ring 44 or 45, respectively interconnecting the inner and outer retaining rings of the respective seal. Inner retaining rings 42 and 43 cover the annular surface portions radially surrounding the recesses in the mutually facing inner surfaces of the two valve heads 7 and 8, respectively. The outer retaining rings 40 and 41 extend to points closely adjacent the stepped projections 34 and 35, respectively, and are clamped between sleeves 36 and 37, respectively, and the corresponding outer surface portions of valve heads 7 and 8, respectively, so as to form a seal therebetween. Each sealing ring 44 and 45 is formed as an annular bead comprising a lip projecting above the surface of each valve head 7 or 8, respectively, facing towards the other valve head 8 or 7, respectively. The lip of the lower sealing ring is designated by reference numeral 46, and that of the upper sealing ring by reference numeral 47. The spacing between lips 46 and 47 is smaller than the spacing between inner retaining rings 42 and 43. Lips 46 and 47 safely maintain the sealing properties of the valve even over an extended period of use. Seals 38 and 39 are integrally formed of rubber or of a rubber-like material and vulcanized onto the respective valve head. The screw-threaded connection between sleeves 36 and 37 and valve heads 7 and 8, respectively, employed for clamping outer retaining rings 40 and 41, respectively, between sleeves 36 and 37, respectively; and projections 34 and 35, respectively, may additionally be employed for readjusting sealing rings 44 and 45 with their lips 46 and 47, respectively, for compensating any wear to which they may be subjected.

Replacement of excessively worn seals 38 and 39 is readily accomplished by loosening the screw-threaded connection between valves heads 7 and 8 and sleeves 36 and 37, respectively. In the case of the advancing valve head 7, however, it is additionally required to loosen the screw-threaded connection with an end portion 48 of actuating rod 21. End portion 48 is formed both with injection bores 25 and connecting bores 14, the latter communicating with the deeper recess of the advancing valve head 7 on the one hand, and to drain passage 10 through an axial bore 49 in end portion 48. A seal 50 is located between follower valve head 8 and actuating rod 21.

Figure 3:
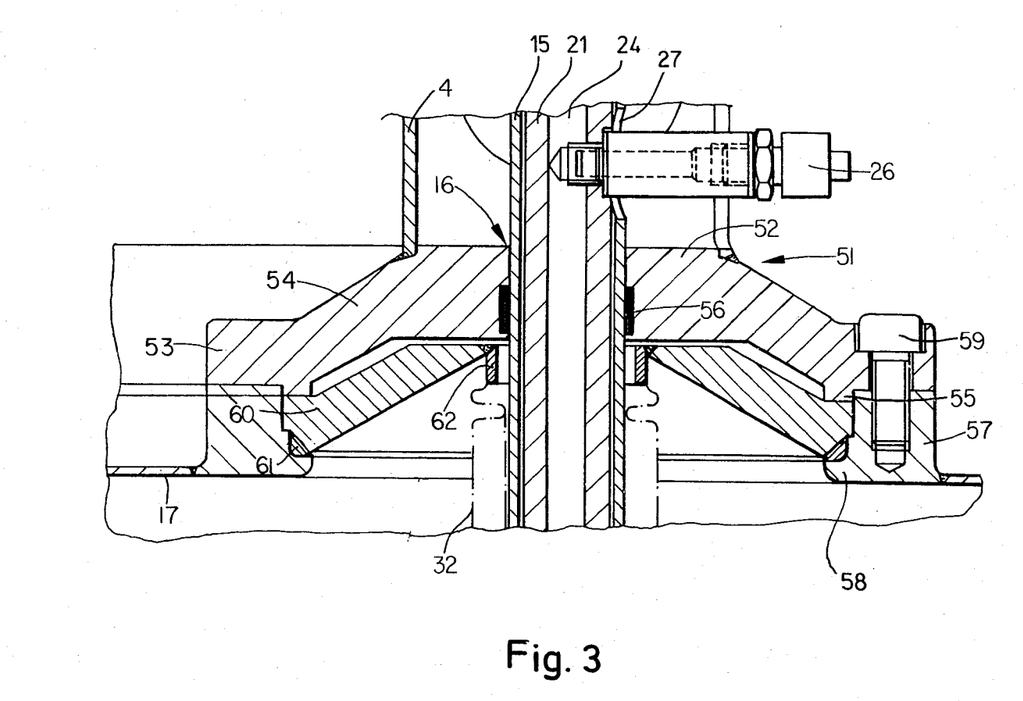
FIG. 3 shows an enlarged partial view of a portion designated B in FIG. 1, showing the arrangement of an upper cover and associated parts.

Shown in FIG. 3 on an enlarged scale is the passage of actuating rod 21 and actuating tube 15 through passage opening 16 in conduit wall 17 of upper product conduit 3, and the connection of upper bellows 32 to conduit wall 17. Also shown is the connector nipple 26 for supplying the cleaning liquid to the hollow actuating rod 21. Passage opening 16 for actuating tube 15 and actuating rod 21 is formed in an outer carrier flange 51, consisting of an annular center portion 52 having horizontal upper and lower surfaces extending perpendicular to actuating rod 21, a downwards offset outer annular portion 53 parallel to annular portion 52 and likewise formed with horizontal upper and lower surfaces, and an intermediate annular portion 54 of conical configuration having parallel upper and lower surfaces connecting the inner and outer annular portions. At the transition between the outer and intermediate annular portions 53 and 54, respectively, the lower side of outer carrier flange 51 is formed with a downwards extending annular projection 55. Intermediate housing 4 is welded to the upper side of outer carrier flange 51 adjacent the transition between the inner and intermediate annular portions 52 and 54, respectively. A guide sleeve 56 is located between actuating tube 15 and outer carrier flange 51.

An annular flange 57 of substantially square cross-sectional configuration has the lower portion of its radially inner surface formed with a shoulder 58, resulting in a substantially L-shaped cross-section. Flange 57 is welded to conduit wall 17 in such a manner that its upper surface engages the lower surface of outer annular portion 53 of carrier flange 51, while its radially inner surface engages annular projection 55 thereof. Carrier flange 51 is connected to annular flange 57 by a number of headed bolts 59.

A cover 60 is disposed below carrier flange 51 in such a manner that a central portion thereof having rectangular cross-sectional configuration extends parallel to intermediate annular portion 54, while an inner end portion thereof of triangular cross-sectional configuration with its pointed end facing towards actuating tube 15 has an upper surface extending parallel to the inner annular portion 52 of outer carrier flange 51. The central portion of cover 60 is formed with an outer end portion having a horizontally extending, plane upper surface and a bevelled lower surface. This outer end portion of cover 60 is received between annular projection 55 of outer carrier flange 51 and shoulder 58 of annular flange 57, with a static seal 61 being interposed between its bevelled lower surface and shoulder 58. Bevelled lower surface is of such a shape that it forms a triangular recess with its point directed downwards with the lower side of the central portion of cover 60.

A sleeve 62 surrounding actuating tube 15 is sealingly welded to the upper end of upper bellows 32 on the one hand and with the point of the inner end portion of cover 60 on the other.

Figure 4:
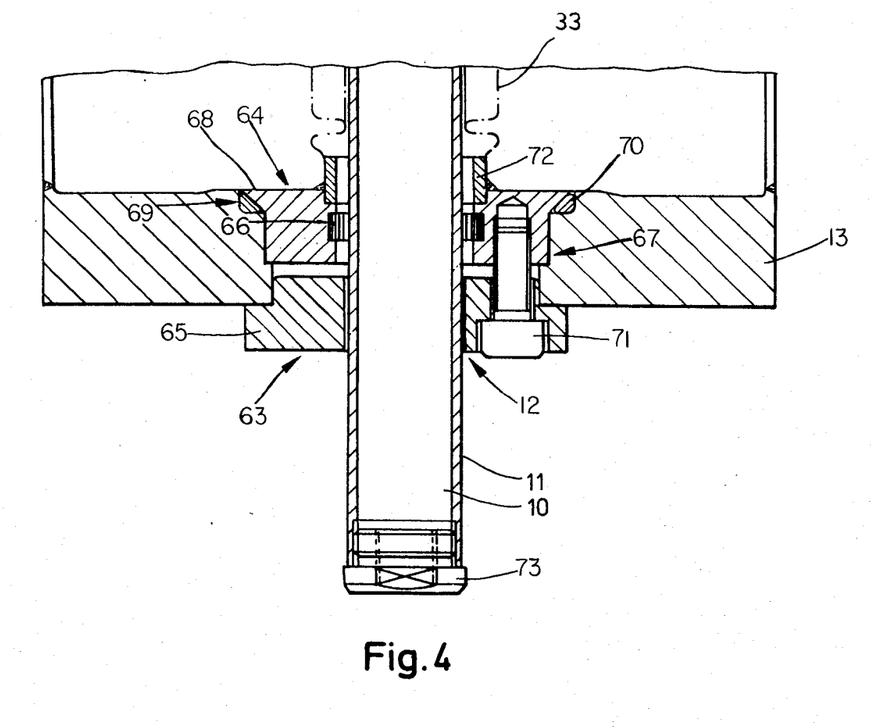
FIG. 4 shows an enlarged partial view of the portion designated C in FIG. 1, showing the arrangement of a lower cover and associated parts.

Shown in FIG. 4 on an enlarged scale is the passage of drain pipe 11 through passage opening 12 of lower conduit wall 13 of lower product conduit 2, and the connection between lower bellows 33 and conduit wall 13.

Passage opening 12 is formed in an outer clamping flange 63 and in an inner cover 64 disposed thereabove, both of which are located between drain pipe 11 and conduit wall 13 so as to close an opening formed therein. Outer clamping flange 63 is formed with a peripheral projection 65 seated on conduit wall 13. A guide sleeve 66 is disposed between cover 64 and drain pipe 11. The lower surface of inner cover 64 seats on a stop shoulder 67 formed in the opening of conduit wall 13. The upper surface of cover 64 is formed with a peripheral annular projection 68 having a bevelled lower surface. Between the bevelled lower surface of annular projection 68 and a complementary recess 69 in conduit wall 13 there is located a static seal 70. Headed bolts 71 connect outer clamping flange 63 to inner cover 64. A sleeve 72 surrounding drain pipe 11 is sealingly welded to the lower end of bellows 33 and to inner cover 64. The lower end of drain pipe 11 is provided with a removable screwthreaded plug member 73 for protecting the bellows against damage on disassembly of the valve. After removal of headed bolts 71 and 59, drain pipe 11, valve heads 7 and 8, actuating tube 15 and actuating rod 15 may be withdrawn from the valve in an upward direction, an important role being played by the releasable connection between the valve heads and the actuating rod and drain pipe, respectively. It is also of importance that the closure assembly can be of an economic design.

A second embodiment of a sealing arrangement is shown in FIG. 5. In contrast to the above described embodiment, the housing of the second embodiment is formed of two separate parts connected to one another by headed bolts 74. A major portion of the valve seat is formed by a sealing ring 75 of trapezoidal cross-sectional configuration clamped within a correspondingly shaped groove of the two-part housing. The width of sealing ring 75 is greater than the stroke of the two valve heads 7 and 8 as they are moved apart for cleaning purposes. Sealing of the leak control space is accomplished by means of a seal 76 retained in a groove formed in the lower surface of follower valve head 8. In the example, shown, the groove is formed in the non-recessed annular portion of the valve head. With regard to their function, the two seals 75 and 76 replace the seals 38 and 39 described with reference to the preceding embodiment. In the FIG. 5 embodiment, valve heads 7 and 8 are directly welded to drin pipe 1 and lower bellows 33 and actuating tube 15 and upper bellows 32, respectively. A releasable connection of the valve heads 7 and 8 is thus not provided. In a similar manner, actuating rod 21 is directly welded to advancing valve head 7. The recesses forming the leak control space and the injection and connecting bores are formed as in the FIG. 1 embodiment.

Figure 6:
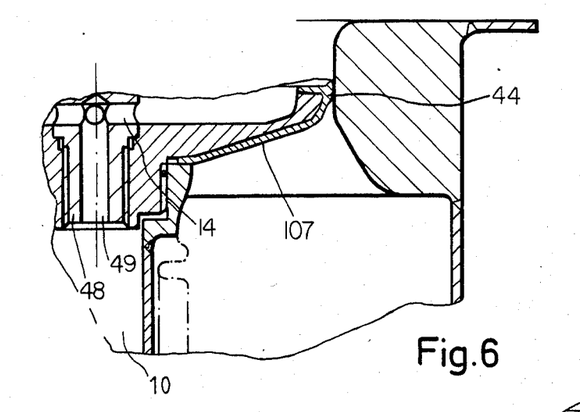
FIG. 6 shows a sectional view of a resilient valve head according to a first example.

A valve head shown in FIG. 6 is generally of the same configuration as the valve head 7 shown in FIG. 2 although of a reduced wall thickness resulting in a bell-shaped cross section, so that any wear of seal 44 can be compensated by resilient expansion of valve head 107 in radial direction. Valve head 107 may be formed of metal or any other suitable material.

Figure 7:
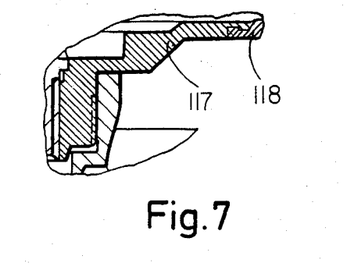
FIG. 7 shows a second example of a resilient valve head with a profile seal member clamped therein.

FIG. 7 shows the righthand half of a valve head 117 of a design similar to that shown in FIG. 6. Valve head 117 is also of reduced wall thickness, so as to be resiliently deformable, and has its peripheral portion provided with a profiled sealing member 118. This arrangement permits the sealing properties of the valve to be readily and economically restored by replacing the seal member 118 in the case of particularly abrasive product handling.

Figure 8:
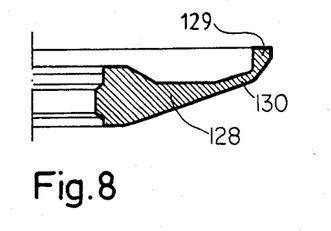
FIG. 8 shows a sectional view of a valve head formed integrally with a seal of a plastics material.

FIG. 8 shows the righthand half of a valve head 128 provided with a sealing bead at its outer periphery and formed in one piece of a plastics material. A reduced wall thickness in the portion 130 of valve head 128 adjacent sealing bead 129 results in a suitable resiliency of valve head 128 in radial directions.

As shown in FIG. 1, metal bellows 32 has its upper end welded to upper conduit wall 17. Its lower end is welded to the upper surface of follower valve head 8, so that any rotation of valve head 8 would subject bellows 32 to torsional stresses, whereby the life span of bellows 32 would be considerably reduced.

The same danger exist with respect to lower bellows 33.

Figure 9:
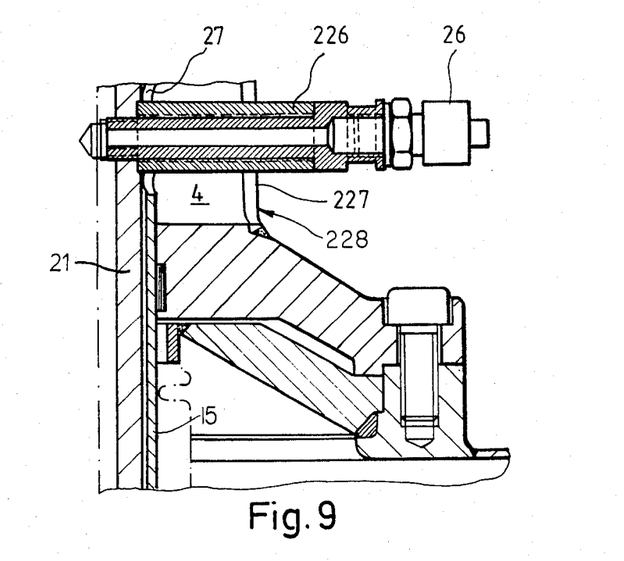
FIG. 9 shows a rotation-preventing arrangement for the bellows.

Shown in FIG. 9 is a rotation-preventing arrangement for the two bellows 32 and 33.

In this arrangement, the connector nipple 26 shown in FIG. 3 is provided with a surrounding sleeve 226 having a quadrangular outer cross-section dimensioned such that two of its faces engage the edges of elongate opening 27 and the edges 227 of a through-opening 228 formed in intermediate housing 4.

Connector nipple 26 has its forward end screw-threaded into actuating rod 21 so as to be rigidly connected to valve head 7 and thereby also to bellows 33.

The quadrangular outer sleeve 226 is in positive locking engagement with elongate opening 27 and thus connected to bellows 32 through actuating tube 15 of valve head 8.

On the other hand, outer sleeve 226 is in positive locking engagement with the edges of through-opening 228 of intermediate housing 4.

In this manner the two bellows are prevented from rotating in a simple and economical manner.

We claim:

1. A double-seat valve comprising an advancing valve head movable axially between a closed position and an open position, a coaxial follower valve head having a closed position intermediate said open and closed positions of the advancing valve head and having an open position in which it is engaged with the advancing valve head, and a valve housing providing for communication between a pair of ducts when said valve heads are in their open positions and defining a seat for each said valve head which the valve head sealingly engages when it its closed position, said valve housing being cooperable with the valve heads in their closed positions to define a leakage chamber between them which is substantially sealed from each of said ducts by one of said valve heads and which is drained to a leakage outlet remote from said ducts, said double-seat valve being characterized by:

A. said follower valve head having a diameter at least as large as that of said advancing valve head;

B. each of said valve heads having radially outwardly facing sealing means around its periphery;

C. said valve housing having therein a passage for communicating said ducts which has a pair of cylindrical surface portions, one for each of said valve heads, each said cylindrical surface portion
(1) having a diameter for slidable sealing engagement by its valve head and
(2) extending a substantial distance axially along said passage, with one end adjacent to the other cylindrical surface portion and an oppposite end remote therefrom, said seat for each valve head comprising a zone of its cylindrical surface portion that is intermediate said ends thereof;

D. an actuating rod to which one of said valve heads has a coaxial connection, said actuating rod having a feed bore therein,
(1) one end of which is communicated with a cleaning fluid inlet that is axially spaced from both of said valve heads and
(2) the other end of which is communicated with a plurality of nozzle bores that are between the valve heads and open radially outwardly for discharge towards said cylindrical surface portions; and E. actuating means for moving each of said valve heads independently of the other axially within its said cylindrical surface portion between its seat and a defined position in which the valve head is spaced from its seat and is at the axial side thereof that is remote from the other valve head but maintains sealing engagement with its cylindrical surface, to provide for cleaning the valve seats without contamination of said ducts.

2. The double seat valve of claim 1 wherein the diameter of said follower valve head is equal to that of said advancing valve head, and said cylindrical surface portions are axially continuous with one another.

3. The double-seat valve of claim 1, further characterized by:

F. a second actuating rod to which the other of said valve heads has a coaxial connection, said second actuating rod being tubular and coaxially slidably surrounding the first mentioned actuating rod for axial guidance of one of said actuating rods by the other.

4. The double seat valve of claim 3 wherein said first and second actuating rods extend transversely across one of said ducts and through a hole in the wall of said one duct that is coaxial with said cylindrical surface portions and spaced from them, further characterized by:

an elongated bellows surrounding said actuating rods and having at one end thereof a sealing connection to the wall of said one duct, around said hole therein, and having at an opposite end thereof a sealing connection with said follower valve head, around said second actuating rod.

5. The double seat valve of claim 4, further characterized by: a nipple fixed to the first mentioned actuating rod and communicating with the feed bore therein, said nipple projecting laterally from that actuating rod through a lengthwise extending slot in said second actuating rod and through a registering slot in fixed structure adjacent to the actuating rods to prevent rotation of the advancing valve head whereby said bellows would be twisted, and said nipple further providing for introduction of cleaning fluid into said feed bore.

6. The double seat valve of claim 1 wherein said valve heads are equal in diameter and said cylindrical surface portions are axially continuous with one another, wherein the advancing valve head is below the follower valve head and moves upward to its open position, and wherein said actuating rod has a coaxial connection to the advancing valve head and projects upwardly therefrom, further characterized by:

G. the advancing valve head having a concentric concavity in its upper surface that is surrounded by an annular ridge which is sealingly engageable with bottom surface portions of the follower valve head to define a leakage confining space which is sealed off from said ducts when the valve heads are in their open positions; and H. a downwardly projecting drain tube having a coaxial connection to the advancing valve head and communicated through the latter with the space between the valve heads for conducting leakage to said outlet.

7. The double-seat valve of claim 6 wherein the follower valve head has a coaxial connection to a second actuating rod that is tubular and surrounds the first mentioned actuating rod, further characterized by said sealing means on each valve comprising:
(1) a sealing ring projecting beyond the outer periphery of the valve head, and
(2) a pair of retaining rings located adjacent the sealing ring and in contact with the upper and lower surfaces, respectively, of the valve head,
(a) one of said retaining rings on the follower valve head having a portion adjacent to its said connection with the second actuating rod and whereby that connection is sealed, and
(b) one of said retaining rings on the advancing valve head having a portion adjacent to its said connection with the drain tube and whereby that connection is sealed.

8. The double seat valve of claim 7 wherein the sealing ring for each valve head is formed integrally with its adjacent retaining rings and is of elastomeric material, and wherein the other one of said pair of retaining rings is bonded to the valve head.

9. The double seat valve of claim 6 wherein said drain tube extends transversely across one of said ducts and downwardly through a hole in the wall of said one duct that is coaxial with said cylindrical surface portions and spaced downward from them, further characterized by:

an elongated bellows surrounding said drain pipe and having at one of its ends a sealing connection to said one duct, around said hole therein, and having at its opposite end a sealing connection with said advancing valve head, around said drain pipe.

* * * * *